(12) United States Patent
Komada

(10) Patent No.: US 11,401,007 B2
(45) Date of Patent: Aug. 2, 2022

(54) HYDRAULIC DEVICE

(71) Applicant: Shimano Inc., Osaka (JP)

(72) Inventor: Yasuyuki Komada, Osaka (JP)

(73) Assignee: Shimano Inc., Osaka (JP)

(*) Notice: Subject to any disclaimer, the term of this patent is extended or adjusted under 35 U.S.C. 154(b) by 171 days.

(21) Appl. No.: 16/438,171

(22) Filed: Jun. 11, 2019

(65) Prior Publication Data

US 2020/0039608 A1 Feb. 6, 2020

(30) Foreign Application Priority Data

Jul. 31, 2018 (DE) .................... 10 2018 118 460.3

(51) Int. Cl.
*B62M 19/00* (2006.01)
*B62M 6/45* (2010.01)

(52) U.S. Cl.
CPC .............. *B62M 19/00* (2013.01); *B62M 6/45* (2013.01)

(58) Field of Classification Search
CPC ...... B60T 11/20; B60T 11/232; B60T 11/236; B60T 7/102; B60T 11/16; B60T 11/165; B62M 19/00; B62M 6/45; B62K 23/06; B62K 23/02; B62L 1/005; B62L 3/023; B62L 3/026; F16J 1/005; F16J 10/02; F16J 15/16
See application file for complete search history.

(56) References Cited

U.S. PATENT DOCUMENTS

| | | | | |
|---|---|---|---|---|
| 3,802,200 A * | 4/1974 | Kolm | ...................... | B62L 3/023 60/588 |
| 4,793,139 A * | 12/1988 | Reynolds | ................ | B60T 11/16 60/562 |
| 7,997,075 B2 * | 8/2011 | Drott | ....................... | B60T 11/16 60/588 |
| 9,969,373 B2 * | 5/2018 | Konig | .................... | B60T 11/232 |
| 10,562,584 B2 * | 2/2020 | Komada | ................ | B62M 25/08 |
| 10,589,819 B2 * | 3/2020 | Komada | ................ | B62M 25/04 |
| 11,203,394 B2 * | 12/2021 | Komada | ................ | B62L 3/023 |
| 2002/0134451 A1 * | 9/2002 | Blasko | .................. | B32B 37/153 138/140 |
| 2005/0081521 A1 * | 4/2005 | Okuma | ................... | B60T 11/16 60/533 |
| 2005/0247193 A1 * | 11/2005 | Reuter | ..................... | F16J 10/02 92/169.1 |

(Continued)

FOREIGN PATENT DOCUMENTS

| | | |
|---|---|---|
| CN | 201633864 U | 11/2010 |
| GB | 2077882 A * | 12/1981 |

(Continued)

OTHER PUBLICATIONS

Chinese Patent Office Search Report of Corresponding Chinese Application No. 2019106719139, dated Sep. 27, 2020 (Year: 2020).*

(Continued)

*Primary Examiner* — Vinh Luong
(74) *Attorney, Agent, or Firm* — Global IP Counselors, LLP

(57) ABSTRACT

A hydraulic device is provided for a human powered vehicle. The hydraulic device includes a piston, a base member, and a hydraulic cylinder. The base member is made of a first non-metallic material. The hydraulic cylinder is provided to the base member and defines a cylinder bore. The hydraulic cylinder includes a main portion in which the piston is movably arranged. The main portion is made of a second non-metallic material that is different from the first non-metallic material.

20 Claims, 10 Drawing Sheets

(56) References Cited

U.S. PATENT DOCUMENTS

| | | | | |
|---|---|---|---|---|
| 2007/0006584 | A1* | 1/2007 | Goto | B60T 11/20 60/562 |
| 2007/0283691 | A1* | 12/2007 | Tetsuka | B62L 3/023 60/594 |
| 2011/0048873 | A1 | 3/2011 | Wang | |
| 2012/0322336 | A1* | 12/2012 | Richardson | A63H 33/18 446/46 |
| 2013/0180815 | A1* | 7/2013 | Dunlap | B60T 11/236 188/344 |
| 2014/0150645 | A1* | 6/2014 | Lhuillier | B60T 11/232 92/248 |
| 2015/0321725 | A1* | 11/2015 | Kariyama | B62K 23/06 74/491 |
| 2017/0106939 | A1* | 4/2017 | Snead | B62K 23/06 |
| 2018/0099724 | A1* | 4/2018 | Nakai | B62K 23/06 |
| 2018/0178878 | A1* | 6/2018 | Komada | B62L 3/023 |
| 2021/0339819 | A1* | 11/2021 | Hidaka | B62K 23/06 |

FOREIGN PATENT DOCUMENTS

| | | | | |
|---|---|---|---|---|
| JP | 57-4447 | * | 1/1982 | F16D 25/08 |
| WO | WO 2016030789 A1 | * | 3/2016 | B60T 11/20 |

OTHER PUBLICATIONS

Resin, Wikipedia, Dec. 27, 2020 (Year: 2020).*
Handbook of Polymer Synthesis, Characterization, and Processing, Chapter 11, Rudolf Pfaendner, Feb. 22, 2013 (Year: 2013).*
Polymer additives, DEGRUYTER. Physical Sciences Review, Valentina et al., Jan. 30, 2016 (Year: 2016).*
What Additive Applications Improve Resin Characteristics? Jan. 26, 2018 by Midstate Mold (Year: 2018).*
Define between, dictionary.com, Jan. 25, 2021 (Year: 2021).*
Define polymer additives, Google Search, Jan. 25, 2021 (Year: 2021).*
Define resin, Google Search, Jan. 25, 2021 (Year: 2021).*
Define co-moulding, Google Search, Sep. 26, 2021 (Year: 2021).*
Everything You Need to Know About Overmolding Prototypes, Tony Rogers, Creative Mechanisms Blog, Aug. 26, 2015 (Year: 2015).*
Multi-material injection molding, Wikipedia, Sep. 26, 2021 (Year: 2021).*
Derwent Abstract of JP 57004447, Nakamura et al., Jan. 11, 1982 (Year: 1982).*
Define attach, Google Search, Mar. 16, 2022 (Year: 2022).*

* cited by examiner

HYDRAULIC DEVICE

CROSS-REFERENCE TO RELATED APPLICATIONS

This application claims priority to German Patent Application No. DE 10 2018 118 460.3, filed on Jul. 31, 2019. The entire disclosure of German Patent Application No. DE 10 2018 118 460.3 is hereby incorporated herein by reference.

BACKGROUND

Technical Field

The present invention generally relates to a hydraulic device.

Background Information

A human powered vehicle includes a hydraulic component.

SUMMARY

In accordance with a first aspect of the present disclosure, a hydraulic device is provided for a human powered vehicle in which the hydraulic device comprises a piston, a base member, and a hydraulic cylinder. The base member is made of a first non-metallic material. The hydraulic cylinder is provided to the base member and defines a cylinder bore. The hydraulic cylinder includes a main portion in which the piston is movably arranged. The main portion is made of a second non-metallic material that is different from the first non-metallic material.

With the hydraulic device according to the first aspect, it is possible to improve flexibility of design of at least one of the base member and the main potion of the hydraulic cylinder since the main portion is made of the second non-metallic material that is different from the first non-metallic material of the base member.

In accordance with a second aspect of the present disclosure, the hydraulic device according to the first aspect is configured so that the first non-metallic material includes a first resin, and the second non-metallic material includes a second resin that is different from the first resin.

With the hydraulic device according to the second aspect, it is possible to improve flexibility of design of at least one of the base member and the main portion since the second non-metallic material includes the second resin that is different from the first resin of the first non-metallic material.

In accordance with a third aspect of the present disclosure, the hydraulic device according to the first or second aspect is configured so that the first non-metallic material includes a first fiber, and the second non-metallic material includes a second fiber that is different from the first fiber.

With the hydraulic device according to the third aspect, it is possible to improve strength of the base member and the main portion.

In accordance with a fourth aspect of the present disclosure, the hydraulic device according to the third aspect is configured so that the first non-metallic material contains the first fiber with a first content ratio, and the second non-metallic material contains the second fiber with a second content ratio different from the first content ratio.

With the hydraulic device according to the fourth aspect, it is possible to improve flexibility of design of at least one of the base member and the main portion.

In accordance with a fifth aspect of the present disclosure, the hydraulic device according to any one of the first to fourth aspects is configured so that the first non-metallic material includes a first additive, and the second non-metallic material includes a second additive that is different from the first additive.

With the hydraulic device according to the fifth aspect, it is possible to change characteristics of the first non-metallic material and the second non-metallic material.

In accordance with a sixth aspect of the present disclosure, the hydraulic device according to the fifth aspect is configured so that the first non-metallic material contains the first additive with a first content ratio, and the second non-metallic material contains the second additive with a second content ratio different from the first content ratio.

With the hydraulic device according to the sixth aspect, it is possible to improve flexibility of design of at least one of the base member and the main portion.

In accordance with a seventh aspect of the present disclosure, the hydraulic device according to any one of the first to sixth aspects is configured so that the hydraulic cylinder is made of the second non-metallic material.

With the hydraulic device according to the seventh aspect, it is possible to improve flexibility of design of at least one of the base member and the hydraulic cylinder since the hydraulic cylinder is made of the second non-metallic material that is different from the first non-metallic material of the base member.

In accordance with an eighth aspect of the present disclosure, the hydraulic device according to any one of the first to seventh aspects is configured so that the hydraulic cylinder is attached directly to the base member without another member between the hydraulic cylinder and the base member. The hydraulic cylinder is attached directly to the base member without an adhesive between the hydraulic cylinder and the base member.

With the hydraulic device according to the eighth aspect, it is possible to simplify the structure of the base member and the hydraulic cylinder.

In accordance with a ninth aspect of the present disclosure, a hydraulic device is provided for a human powered vehicle in which the hydraulic device comprises a piston, a base member, a hydraulic cylinder, and a coupling layer. The base member is made of a first non-metallic material. The hydraulic cylinder is provided to the base member and defining a cylinder bore. The hydraulic cylinder includes a main portion in which the piston is movably arranged. The main portion is made of a second non-metallic material. The coupling layer is at least partly provided between the base member and the main portion of the hydraulic cylinder.

With the hydraulic device according to the ninth aspect, it is possible to improve accuracy of the cylinder bore.

In accordance with a tenth aspect of the present disclosure, the hydraulic device according to the ninth aspect is configured so that the hydraulic cylinder is made of the second non-metallic material, and the coupling layer is provided entirely between the base member and the hydraulic cylinder.

With the hydraulic device according to the tenth aspect, it is possible to improve connection strength between the base member and the hydraulic cylinder.

In accordance with an eleventh aspect of the present disclosure, the hydraulic device according to any one of the first to tenth aspects is configured so that the hydraulic cylinder includes an outer peripheral surface, and the base member at least partly covers the outer peripheral surface of the hydraulic cylinder.

With the hydraulic device according to the eleventh aspect, it is possible to improve connection strength between the base member and the hydraulic cylinder.

In accordance with a twelfth aspect of the present disclosure, the hydraulic device according to any one of the first to eleventh aspects is configured so that the main portion has a first inner diameter and a first radial thickness that is smaller than the first inner diameter. The first radial thickness is equal to or larger than 0.5 mm and equal to or smaller than 5 mm.

With the hydraulic device according to the twelfth aspect, it is possible to reduce the first radial thickness of the main portion.

In accordance with a thirteenth aspect of the present disclosure, the hydraulic device according to f the twelfth aspect is configured so that the cylinder bore includes an additional portion having a second inner diameter smaller that is than the first inner diameter. The additional portion has a second radial thickness that is smaller than the second inner diameter.

With the hydraulic device according to the thirteenth aspect, it is possible to ensure strength of the hydraulic cylinder.

In accordance with a fourteenth aspect of the present disclosure, the hydraulic device according to the thirteenth aspect is configured so that the main portion has a first outer diameter, and the additional portion has a second outer diameter that is smaller than the first outer diameter.

With the hydraulic device according to the fourteenth aspect, it is possible to reduce volume of the hydraulic cylinder with ensure strength of the hydraulic cylinder.

In accordance with a fifteenth aspect of the present disclosure, the hydraulic device according to the thirteenth or fourteenth aspect is configured so that the additional portion extends from the main portion in an axial direction of the hydraulic cylinder.

With the hydraulic device according to the fifteenth aspect, it is possible to improve strength of the hydraulic cylinder.

In accordance with a sixteenth aspect of the present disclosure, the hydraulic device according to any one of the first to fifteenth aspects is configured so that at least one of the base member and the hydraulic cylinder includes an annular groove that communicates with the cylinder bore.

With the hydraulic device according to the sixteenth aspect, it is possible to provide the annular groove in which a seal member is disposed using the at least one of the base member and the hydraulic cylinder.

In accordance with a seventeenth aspect of the present disclosure, the hydraulic device according to the sixteenth aspect is configured so that the hydraulic cylinder includes an inner peripheral surface defining the cylinder bore, and the hydraulic cylinder includes the annular groove that is provided on the inner peripheral surface.

With the hydraulic device according to the seventeenth aspect, it is possible to provide the annular groove in which the seal member is disposed using the hydraulic cylinder.

In accordance with an eighteenth aspect of the present disclosure, the hydraulic device according to the seventeenth aspect is configured so that the base member includes the annular groove that is provided between the base member and the hydraulic cylinder.

With the hydraulic device according to the eighteenth aspect, it is possible to arrange the seal member in the annular groove between the base member and the hydraulic cylinder.

In accordance with a nineteenth aspect of the present disclosure, the hydraulic device according to any one of the first to eighteenth aspects further comprises a hydraulic reservoir including a reserve chamber that is in fluid communication with the cylinder bore.

With the hydraulic device according to the nineteenth aspect, the hydraulic reservoir can absorb change in volume of a hydraulic fluid in the cylinder bore due to change in usage circumstances such as environmental temperature and can absorb change in length of a hydraulic passage in a hydraulic system using the hydraulic device due to wear of a friction member of the hydraulic system.

In accordance with a twentieth aspect of the present disclosure, the hydraulic device according to the nineteenth aspect is configured so that the base member includes a first connecting hole extending from the reserve chamber toward the cylinder bore, and the hydraulic cylinder includes a second connecting hole extending from the cylinder bore to the first connecting hole to connect the reserve chamber to the cylinder bore.

With the hydraulic device according to the twentieth aspect, it is possible to connect the reserve chamber to the cylinder bore with a simple structure.

In accordance with a twenty-first aspect of the present disclosure, the hydraulic device according to any one of the first to twentieth aspects further comprises an operating member movably coupled to the base member so as to move the piston in response to a movement of the operating member.

With the hydraulic device according to the twenty-first aspect, it is possible to operate the piston using the operating member.

In accordance with a twenty-second aspect of the present disclosure, the hydraulic device according to any one of the first to twenty-first aspect further comprises a friction member movably mounted on the base member so as to be moved in response to a movement of the piston.

With the hydraulic device according to the twenty-second aspect, it is possible to apply the structure of the hydraulic device to a brake caliper.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF EMBODIMENTS

Figure 1:
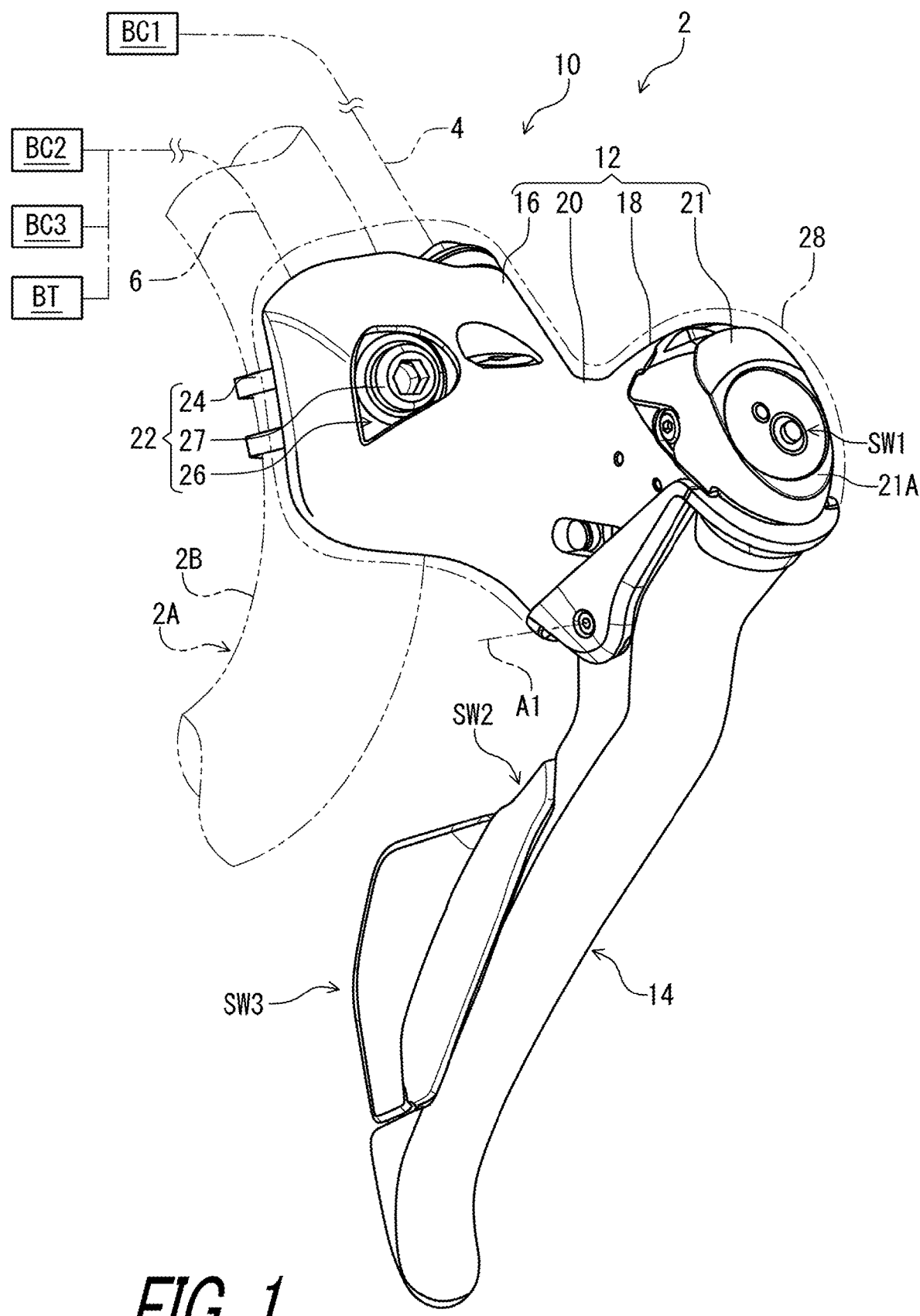
FIG. 1 is a perspective view of a hydraulic device in accordance with an embodiment.

The embodiment(s) will now be described with reference to the accompanying drawings, wherein like reference numerals designate corresponding or identical elements throughout the various drawings.

First Embodiment

FIG. 1 illustrates a hydraulic device 10 for a human powered vehicle 2 in accordance with an embodiment. The hydraulic device 10 is configured to be mounted to a vehicle body 2A of the human powered vehicle 2. In this embodiment, the hydraulic device 10 is configured to be mounted to a steering device 2B (e.g., a handlebar) of the vehicle body 2A. However, the hydraulic device 10 can be mounted to another part of the human powered vehicle 2.

The human powered vehicle 2 is a vehicle to travel with a motive power including at least a human power of a rider who rides the human powered vehicle 2. The human powered vehicle 2 has an arbitrary number of wheels. For example, the human powered vehicle 2 has at least one wheel. In this embodiment, the human powered vehicle 2 preferably has a smaller size than that of a four-wheeled automobile. However, the human powered vehicle 2 can have an arbitrary size. For example, the human powered vehicle 2 can have a larger size than that of the four-wheeled automobile. Examples of the human powered vehicle 2 include a bicycle, a tricycle, and a kick scooter.

In this embodiment, the hydraulic device 10 is used as an operating device operatively coupled to another hydraulic device. The hydraulic device 10 is operatively coupled to a hydraulic component BC1 such as a hydraulic brake caliper. The hydraulic device 10 is operatively coupled to the hydraulic component BC1 with a hydraulic hose 4. However, structures of the hydraulic device 10 can apply to another hydraulic device such as a hydraulic brake caliper.

Figure 2:
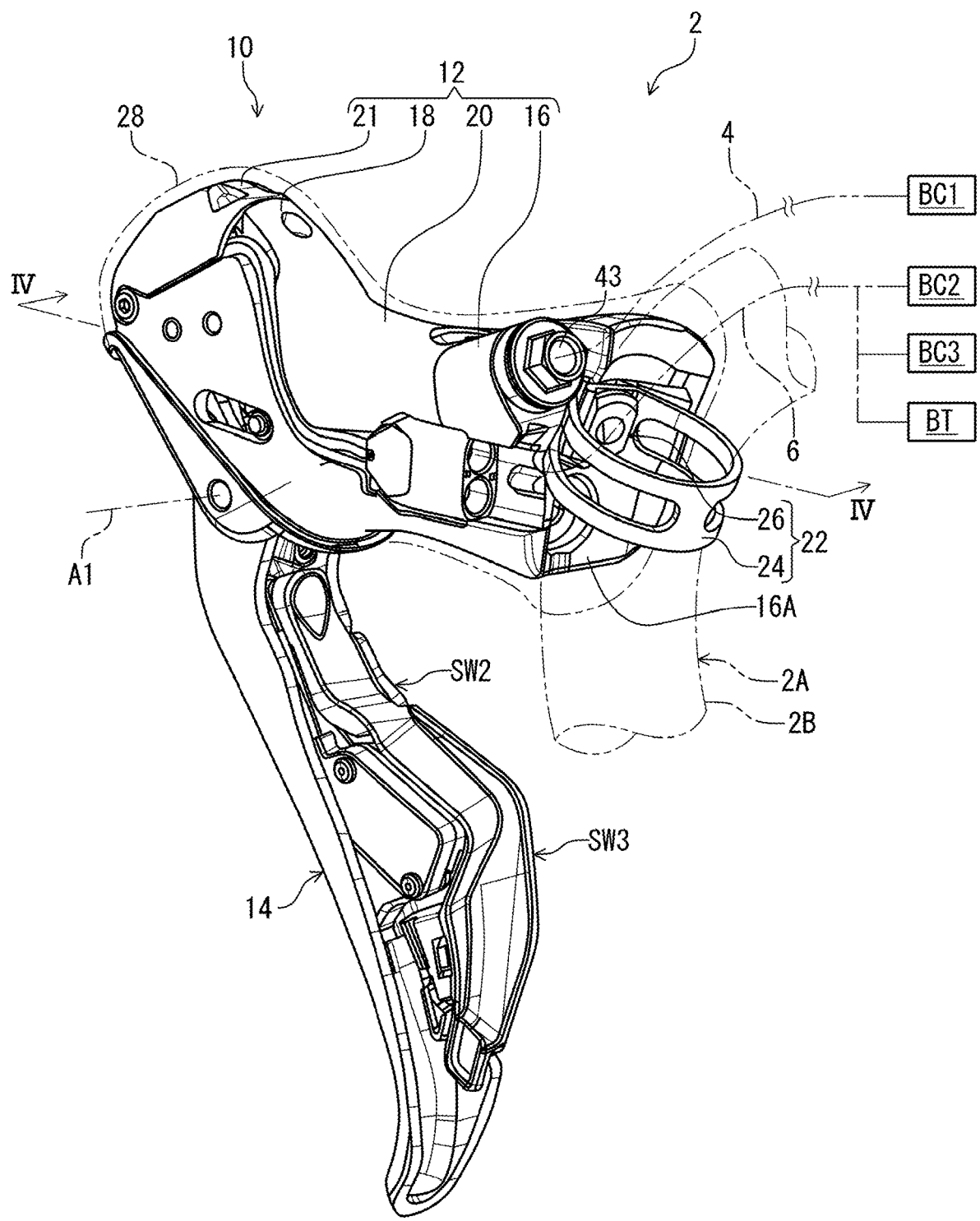
FIG. 2 is another perspective view of the hydraulic device illustrated in FIG. 1.

As seen in FIG. 2, the hydraulic device 10 is operatively coupled to an electrical device BC2 and an additional device BC3. Examples of the electrical device BC2 include an additional or remote operating device, a bicycle seatpost, a bicycle suspension, a bicycle shifting device, a cycle computer, and a smart phone. Examples of the additional device BC3 include an electrical component and a mechanical component. Examples of the electrical component include an additional or remote operating device, a bicycle seatpost, a bicycle suspension, a bicycle shifting device, a cycle computer, and a smart phone. Examples of the mechanical component include an additional or remote operating device, a bicycle seatpost, a bicycle suspension, and a bicycle shifting device. In this embodiment, the electrical device BC2 includes the bicycle seatpost, and the additional device BC3 includes the bicycle shifting device.

The hydraulic device 10 is operatively coupled to the electrical device BC2 and the additional device BC3 with an electrical control cable 6. The hydraulic device 10 is operatively coupled to the electrical device BC2 and the additional device BC3 with separate electrical control cables extending from the hydraulic device 10, respectively. The hydraulic device 10 can be operatively coupled to the additional device BC3 with a mechanical control cable in a case where the additional device BC3 includes a mechanical shifting device. Furthermore, the hydraulic device 10 can be operatively coupled to at least one of the electrical device BC2 and the additional device BC3 with wireless communication. At least one of the electrical device BC2 and the additional device BC3 can be omitted if needed and/or desired.

In this embodiment, the hydraulic device 10 is a right-hand side operating/control device configured to be operated by the rider's right hand to actuate the hydraulic component BC1. However, the structures of the hydraulic device 10 can be applied to a left-hand side operating device.

In the present application, the following directional terms "front," "rear," "forward," "rearward," "left," "right," "transverse," "upward" and "downward" as well as any other similar directional terms refer to those directions which are determined on the basis of the user (e.g., the rider) who sits on a saddle or a seat (not shown) of the human powered vehicle or bicycle 2 with facing the steering device or handlebar 2B. Accordingly, these terms, as utilized to describe the hydraulic device 10, should be interpreted relative to the human powered vehicle 2 equipped with the hydraulic device 10 as used in an upright riding position on a horizontal surface.

Figure 3:
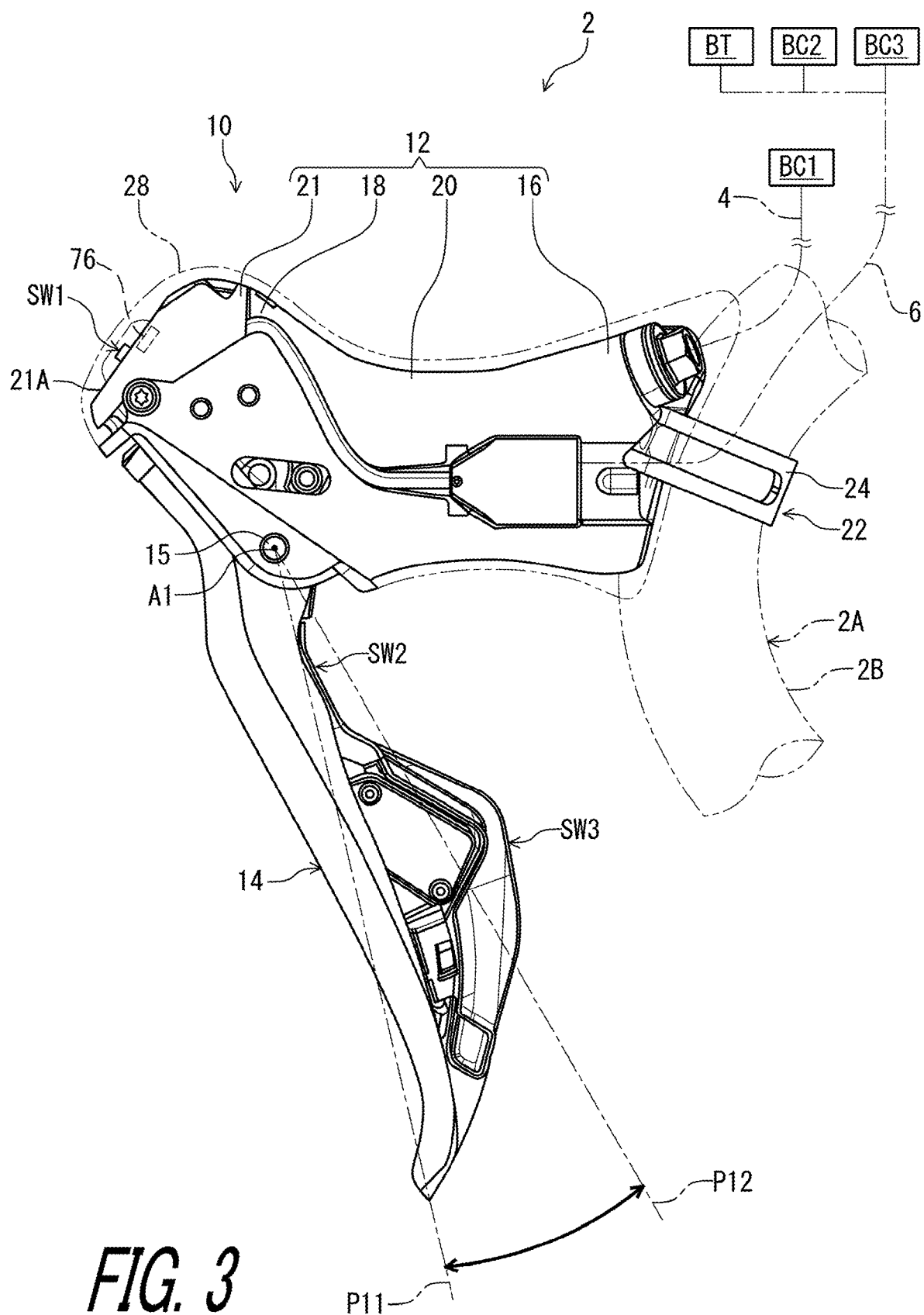
FIG. 3 is a side elevational view of the hydraulic device illustrated in FIG. 1.

As seen in FIG. 3, the hydraulic device 10 for the human powered vehicle 2 comprises a base member 12. The hydraulic device 10 further comprises an operating member 14. The operating member 14 is movably coupled to the base member 12. In this embodiment, the operating device is pivotally coupled to the base member 12 about a pivot axis A1. The operating member 14 is pivotable relative to the base member 12 between a rest position P11 and an operated position P12 about the pivot axis A1. The hydraulic device 10 includes a pivot shaft 15 defining the pivot axis A1. The pivot shaft 15 pivotally couples the operating member 14 to the base member 12.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of a component such as the hydraulic component BC1.

The base member 12 includes a first end portion 16 to be mounted to the steering device 2B. The base member 12 includes a second end portion 18 is opposite to the first end portion 16. In this embodiment, the base member 12 includes a grip portion 20 that is provided between the first end portion 16 and the second end portion 18. The base member 12 comprises a pommel portion 21 provided at the second end portion 18. The pommel portion 21 is a separate member from the base member 12. The pommel portion 21 forwardly upwardly extends from the second end portion 18 in a mounting state where the base member 12 is mounted to the steering device 2B. At least one of the grip portion 20 and the pommel portion 21 can be omitted from the base member 12. The pommel portion 21 can be integrally provided with the base member 12 as a one-piece unitary member.

As seen in FIG. 2, the first end portion 16 defines a first end surface 16A configured to be in contact with the steering device 2B. As seen in FIG. 3, the pommel portion 21 defines a second end surface 21A farthest from the first end surface 16A. In this embodiment, the first end surface 16A has a curved surface, and the second end surface 21A has a flat surface. However, the shapes of the first end portion 16 and the second end portion 18 are not limited to this embodiment.

As seen in FIG. 2, the hydraulic device 10 further comprises a mounting structure 22 to mount the first end portion 16 to the steering device 2B. The base member 12 is a stationary member when mounted to the steering device 2B. The mounting structure 22 preferably includes a band clamp 24 and a tightening member 26. The tightening member 26 is coupled to the band clamp 24 and includes a tool engagement member 27 (FIG. 1) so as to clamp the steering device 2B between the band clamp 24 and the first end portion 16. The mounting structure 22 can include other structures which is similar to the band clamp 24 and which is used in a road shifter for mounting to a drop-down handlebar.

The hydraulic device 10 further comprises a grip cover 28 attached to the base member 12 to at least partly cover the base member 12. The grip cover 28 is made of a non-metallic material such as rubber. The pommel portion 21 is at least partly covered with the grip cover 28. A rider sometimes grips the base member 12 (e.g., the grip portion 20) and leans on the base member 12 (e.g., the grip portion 20) during riding. The grip cover 28 can be omitted from the hydraulic device 10.

Figure 4:
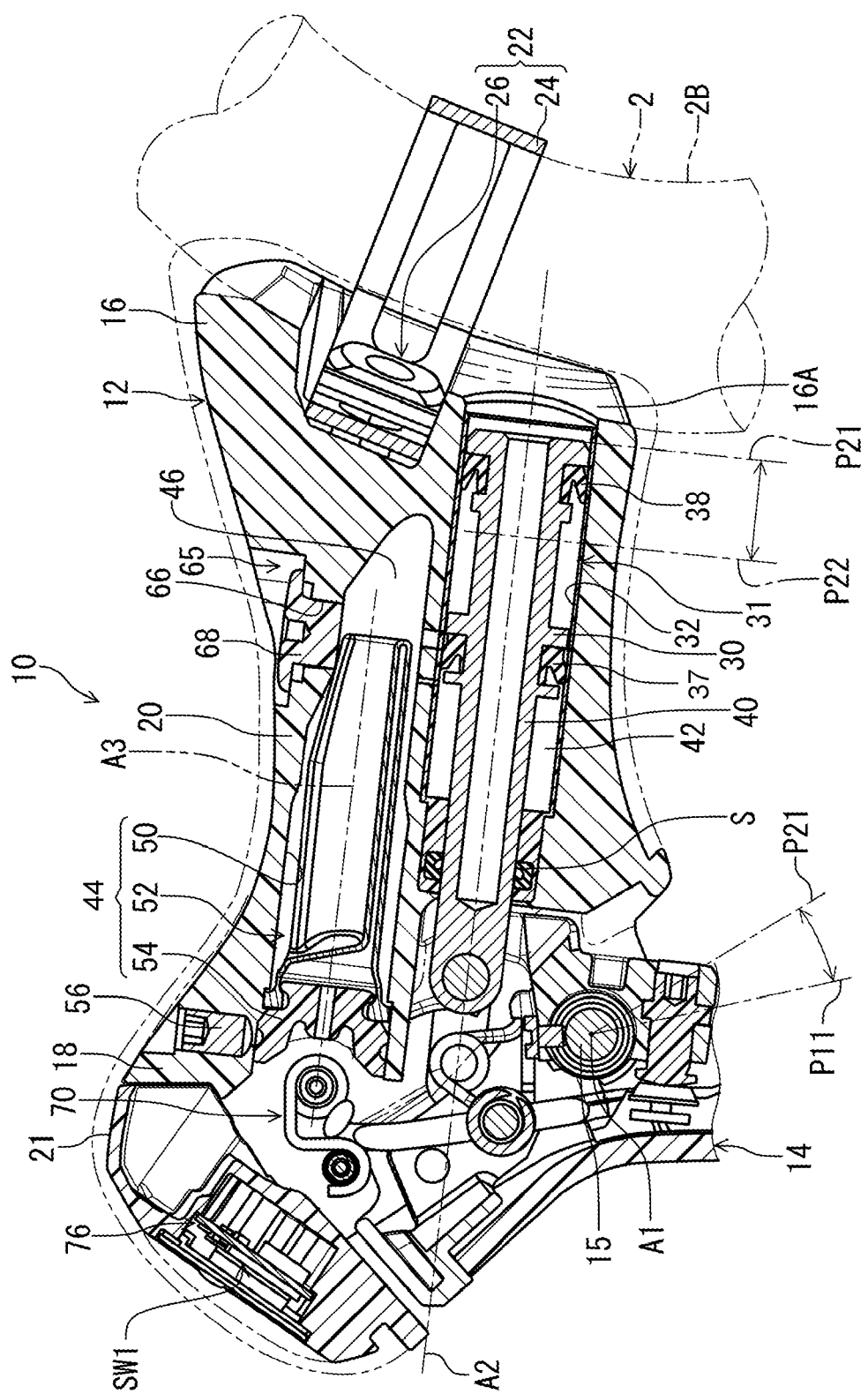
FIG. 4 is a cross-sectional view of the hydraulic device taken along line IV-IV of FIG. 2.

As seen in FIG. 4, the hydraulic device 10 for the human powered vehicle 2 comprises a piston 30 and a hydraulic cylinder 31. The hydraulic cylinder 31 is provided to the base member 12. The hydraulic cylinder 31 defines a cylinder bore 32. The cylinder bore 32 has a cylinder center axis A2. The cylinder bore 32 extends along the cylinder center axis A2. The cylinder bore 32 is provided in the grip portion 20. The cylinder bore 32 is closer to the first end portion 16 than the pivot axis A1. The cylinder bore 32 is arranged between the pivot axis A1 and the first end portion 16. The pivot axis A1 is farther from the first end portion 16 than the cylinder bore 32.

Figure 5:
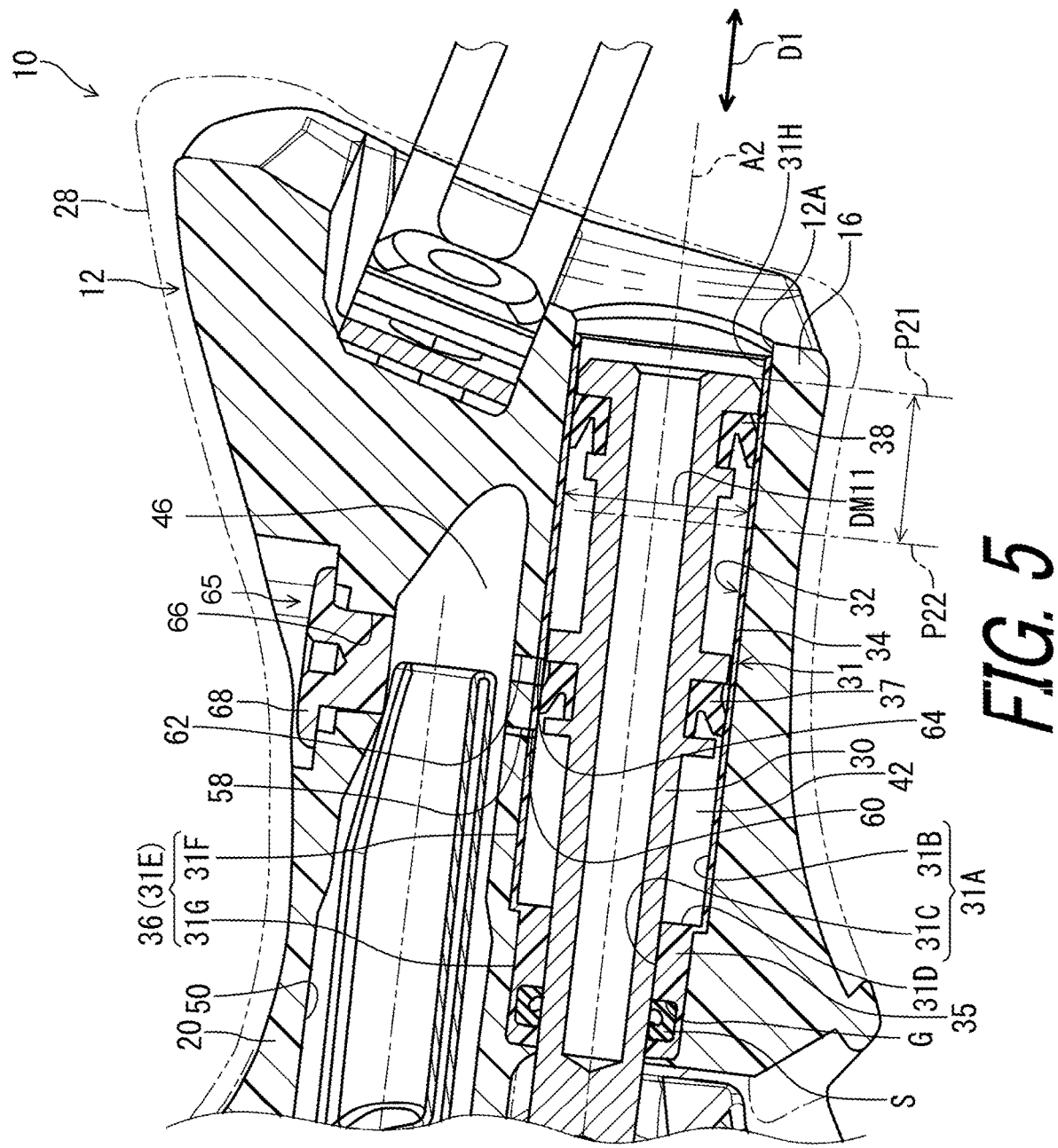
FIG. 5 is a partial cross-sectional view of the hydraulic device illustrated in FIG. 4.

As seen in FIG. 5, the hydraulic cylinder 31 includes a main portion 34 in which the piston 30 is movably arranged. The piston 30 is movably provided in the cylinder bore 32. The operating member 14 is movably coupled to the base member 12 so as to move the piston 30 in response to a movement of the operating member 14. As seen in FIG. 4, the operating member 14 is operatively coupled to the piston 30 to pull the piston 30 from an initial position P21 to an actuated position P22 in response to the pivotal movement of the operating member 14. Namely, the hydraulic device 10 is configured to be a pull-type hydraulic operating device. However, the hydraulic device 10 can be configured to be a push-type hydraulic operating device. The initial position P21 corresponds to the rest position P11 of the operating member 14. The actuated position P22 corresponds to the operated position P12 of the operating member 14.

As seen in FIG. 5, the cylinder bore 32 includes an additional portion 35. The additional portion 35 extends from the main portion 34 in an axial direction D1 of the hydraulic cylinder 31. The axial direction D1 is parallel to the cylinder center axis A2. The additional portion 35 is coupled to the main portion 34.

In this embodiment, the main portion 34 has a tubular shape. The additional portion 35 has a tubular shape. The main portion 34 and the additional portion 35 define the cylinder bore 32. The hydraulic cylinder 31 includes an inner peripheral surface 31A defining the cylinder bore 32. The inner peripheral surface 31A includes a main inner peripheral surface 31B and an additional inner peripheral surface 31C. The hydraulic cylinder 31 includes an intermediate annular surface 31D. The main inner peripheral surface 31B, the additional inner peripheral surface 31C, and the intermediate annular surface 31D define the cylinder bore 32. At least one of the additional portion 35 and the intermediate annular surface 31D can be omitted if needed and/or desired. In particular, if the hydraulic device 10 is configured to be a push-type hydraulic operating device, the additional portion 35 and the intermediate annular surface 31D can be omitted.

Figure 6:
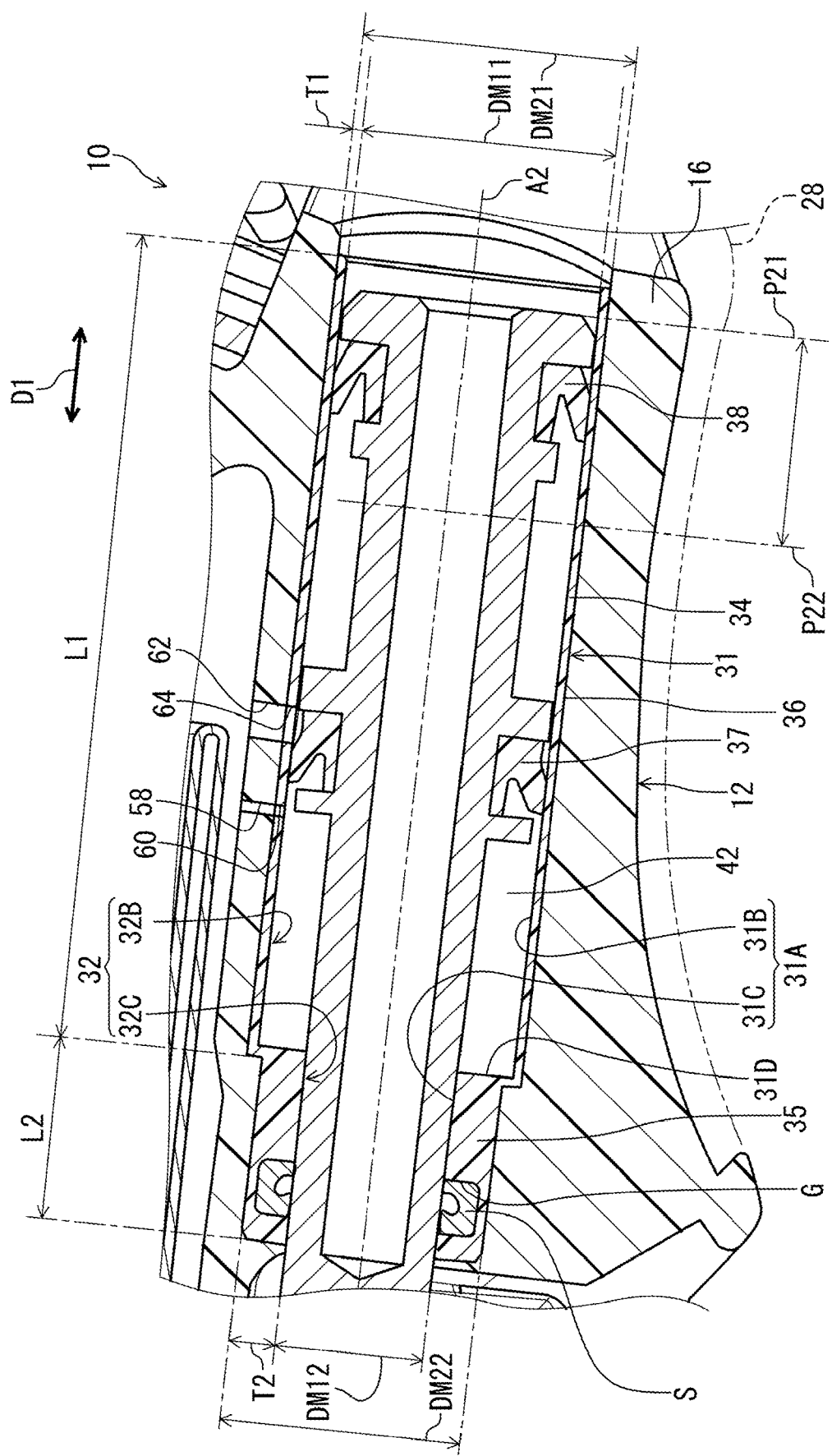
FIG. 6 is an enlarged partial cross-sectional view of the hydraulic device illustrated in FIG. 4.

As seen in FIG. 6, the cylinder bore 32 includes a main bore 32B and an additional bore 32C. The main inner peripheral surface 31B defines the main bore 32B. The additional inner peripheral surface 31C defines the additional bore 32C. The shapes of the cylinder bore 32, the main portion 34, and the additional portion 35 are not limited to this embodiment.

Figure 7:
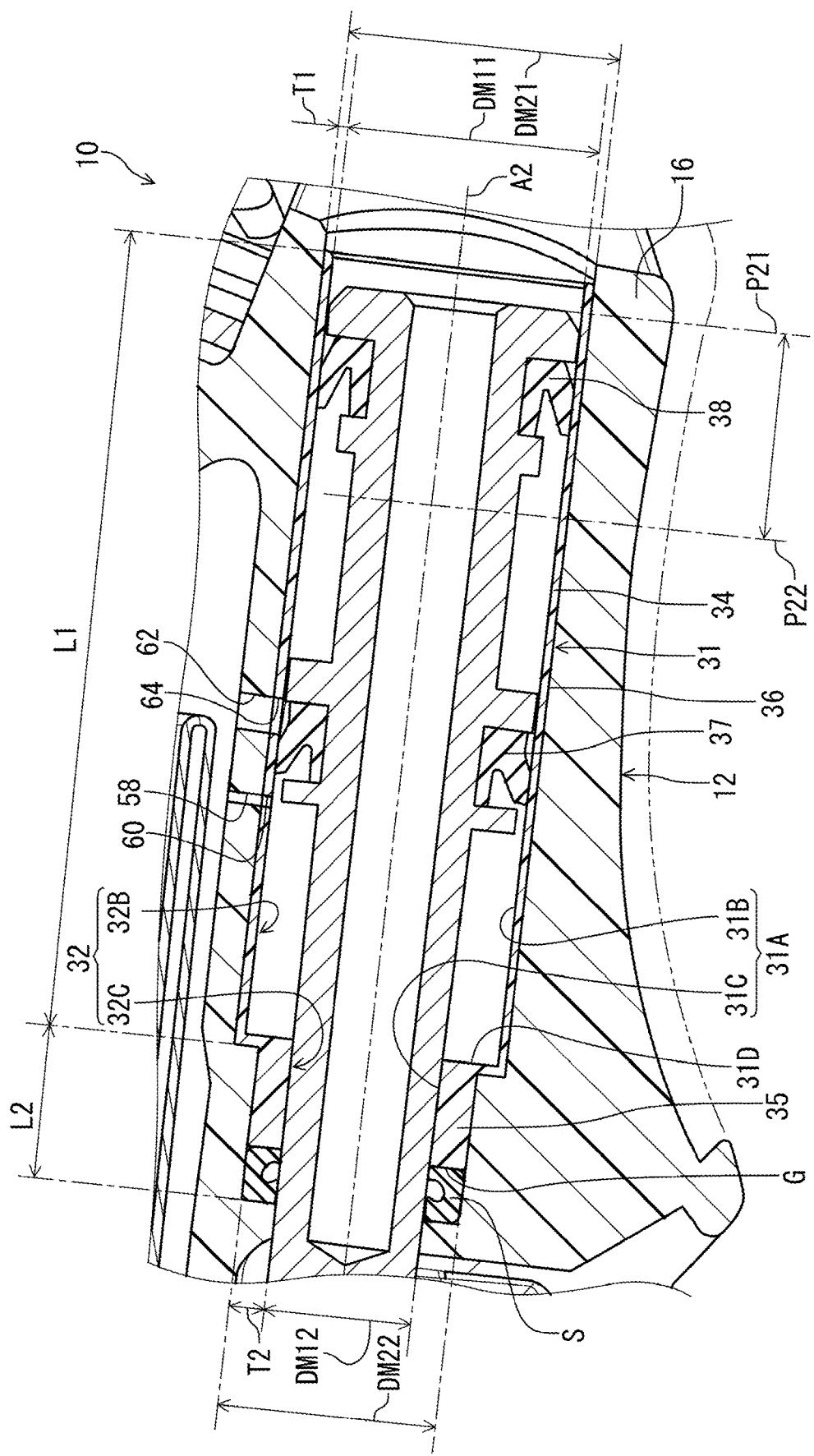
FIG. 7 is an enlarged partial cross-sectional view of a hydraulic device in accordance with a modification.

At least one of the base member 12 and the hydraulic cylinder 31 includes an annular groove G that communicates with the cylinder bore 32. In this embodiment, the hydraulic cylinder 31 includes the annular groove G that is provided on the inner peripheral surface 31A. The annular groove G is provided on the additional inner peripheral surface 31C. The hydraulic device 10 comprises a seal member S having an annular shape. The seal member S is provided in the annular groove G. However, the arrangement of the annular groove G and the seal member S is not limited to this embodiment. As seen in FIG. 7, for example, the base member 12 can include the annular groove G that is provided between the base member 12 and the hydraulic cylinder 31.

As seen in FIG. 5, the base member 12 is made of a first non-metallic material. The main portion 34 is made of a second non-metallic material. The second non-metallic material is different from the first non-metallic material. The first non-metallic material includes a first resin. The second non-metallic material includes a second resin different from the first resin. For example, the first resin includes a first resin component. The second resin includes a second resin component that is different from the first resin component. However, the first non-metallic material and the second non-metallic material are not limited to this embodiment.

In this embodiment, the hydraulic cylinder 31 is made of the second non-metallic material. The hydraulic cylinder 31 is entirely made of the second non-metallic material. The additional portion 35 is made of the second non-metallic material. The additional portion 35 is integrally provided with the main portion 34 as a one-piece unitary member. However, the hydraulic cylinder 31 can be partly made of the second non-metallic material. The additional portion 35 can be a separate member from the main portion 34.

The hydraulic cylinder 31 is attached directly to the base member 12 without another member between the hydraulic cylinder 31 and the base member 12. The hydraulic cylinder 31 is attached directly to the base member 12 without an adhesive between the hydraulic cylinder 31 and the base member 12. However, the hydraulic cylinder 31 can be attached to the base member 12 with another bonding structure such as an adhesive.

The hydraulic device 10 comprises a coupling layer 36 at least partly provided between the base member 12 and the main portion 34 of the hydraulic cylinder 31. The coupling layer 36 couples the main portion 34 of the hydraulic cylinder 31 to the base member 12. The coupling layer 36 is entirely provided between the base member 12 and the main portion 34 of the hydraulic cylinder 31. The coupling layer 36 is provided entirely between the base member 12 and the hydraulic cylinder 31. However, the coupling layer 36 can be partly provided between the base member 12 and the main portion 34 of the hydraulic cylinder 31. The coupling layer 36 can be partly provided between the base member 12 and the hydraulic cylinder 31.

In other words, the hydraulic cylinder 31 includes an outer peripheral surface 31E. The base member 12 at least partly covers the outer peripheral surface 31E of the hydraulic cylinder 31. The base member 12 is directly bonded to the outer peripheral surface 31E of the hydraulic cylinder 31. In this embodiment, the base member 12 entirely covers the outer peripheral surface 31E of the hydraulic cylinder 31. The outer peripheral surface 31E of the hydraulic cylinder 31 is coincident with the coupling layer 36. The hydraulic cylinder 31 is so embedded that an end opening 31H of the hydraulic cylinder 31 is exposed from an opening 12A of the base member 12. The main portion 34 includes a main outer peripheral surface 31F. The additional portion 35 includes an additional outer peripheral surface 31G. The base member 12 entirely covers the main outer peripheral surface 31F and the additional outer peripheral surface 31G. However, the base member 12 can partly cover the outer peripheral surface 31E of the hydraulic cylinder 31. The base member 12 can partly cover at least one of the main outer peripheral surface 31F and the additional outer peripheral surface 31G.

As seen in FIG. 6, the main portion 34 has a first inner diameter DM11 and a first radial thickness T1 that is smaller than the first inner diameter DM11. The first radial thickness T1 is equal to or larger than 0.5 mm. The first radial thickness T1 is equal to or smaller than 5 mm. In this embodiment, the first radial thickness T1 is 1 mm. However, the first radial thickness T1 is not limited to this embodiment and the above ranges.

The additional portion 35 has a second inner diameter DM12 that is smaller than the first inner diameter DM11. The additional portion 35 has a second radial thickness T2 that is smaller than the second inner diameter DM12. The second radial thickness T2 is equal to or larger than 0.5 mm. The second radial thickness T2 is equal to or smaller than 10 mm. In this embodiment, the second radial thickness T2 is 2.5 mm. However, the second radial thickness T2 is not limited to this embodiment and the above ranges.

The main portion 34 has a first outer diameter DM21. The additional portion 35 has a second outer diameter DM22 that is smaller than the first outer diameter DM21. However, the second outer diameter DM22 can be equal to or larger than the first outer diameter DM21.

The main portion 34 has a first axial length L1 defined in the axial direction D1. The additional portion 35 has a second axial length L2 defined in the axial direction D1. The second axial length L2 is smaller than the first axial length L1. The first axial length L1 is larger than the first inner diameter DM11 and the first outer diameter DM21. The second axial length L2 is larger than the second inner diameter DM12 and is smaller than the second outer diameter DM22. However, the dimensional relationship among the first axial length L1, the second axial length L2, the first inner diameter DM11, the first outer diameter DM21, the second inner diameter DM12, and the second outer diameter DM22 is not limited to this embodiment.

The hydraulic device 10 comprises a first seal ring 37 and a second seal ring 38. The first seal ring 37 and the second seal ring 38 are attached to the piston 30. The first seal ring 37 is spaced apart from the second seal ring 38 in the axial direction D1. The first seal ring 37 and the second seal ring 38 are in slidable contact with the inner peripheral surface 31A. In this embodiment, the first seal ring 37 and the second seal ring 38 are in slidable contact with the main inner peripheral surface 31B of the main portion 34. The piston 30 can be in slidable contact with the inner peripheral surface 31A.

As seen in FIG. 4, the hydraulic device 10 comprises a piston rod 40. The operating member 14 operatively couples to the piston rod 40. The piston rod 40 is coupled to the piston 30 and extends from the piston 30 toward an opposite side of the first end portion 16 relative to the piston 30. The piston rod 40 extends through the additional bore 32C of the additional portion 35. The seal member S is in slidable contact with the piston rod 40. The cylinder bore 32, the piston 30, the first seal ring 37, and the seal member S define a hydraulic chamber 42. The hydraulic chamber 42 is filled with a hydraulic fluid such as mineral oil. The hydraulic chamber 42 is connected to an outlet port 43 (FIG. 2). While the piston rod 40 is integrally provided with the piston 30 as a one-piece unitary member in this embodiment, the piston rod 40 can be a separate member from the piston 30.

The hydraulic device 10 further comprises a hydraulic reservoir 44 including a reserve chamber 46 in fluid communication with the cylinder bore 32. In this embodiment, the hydraulic reservoir 44 includes a reservoir bore 50 connected to the cylinder bore 32. The reservoir bore 50 is provided on the base member 12. The reservoir bore 50 is connected to the cylinder bore 32 to allow a hydraulic fluid to flow between the reservoir bore 50 and the cylinder bore 32. The reservoir bore 50 has a reservoir center axis A3. The reservoir bore 50 extends along the reservoir center axis A3. In this embodiment, the reservoir center axis A3 is parallel to the cylinder center axis A2. However, the reservoir center axis A3 can be defined not to be parallel to the cylinder center axis A2.

The hydraulic reservoir 44 includes a diaphragm 52 and a lid 54. The diaphragm 52 is provided in the reservoir bore 50 to be elastically deformable in the reservoir bore 50. The lid 54 is secured to the base member 12 to cover an end opening of the reservoir bore 50. In this embodiment, the lid 54 is secured to the base member 12 with a securing member 56. The reservoir bore 50 and the diaphragm 52 define the reserve chamber 46. The reserve chamber 46 is filled with the hydraulic fluid such as mineral oil.

In this embodiment, the reservoir bore 50 is provided above the cylinder bore 32 in the mounting state where the base member 12 is mounted to the steering device 2B. The reservoir bore 50 is farther from the first end portion 16 than the cylinder bore 32. However, the position of the reservoir bore 50 is not limited to this embodiment. The reservoir bore 50 can be omitted from the hydraulic device 10.

As seen in FIG. 6, the base member 12 includes a first connecting hole 58 extending from the reserve chamber 46 toward the cylinder bore 32. The hydraulic cylinder 31 includes a second connecting hole 60 extending from the cylinder bore 32 to the first connecting hole 58 to connect the reserve chamber 46 to the cylinder bore 32. The first connecting hole 58 and the second connecting hole 60 connect the reserve chamber 46 with the hydraulic chamber 42 in a state where the piston 30 is positioned at the initial position P21. The first seal ring 37 interrupts communication between the hydraulic chamber 42 and the reserve chamber 46 with the first connecting hole 58 and the second connecting hole 60 when the piston 30 is moved from the initial position P21 toward the actuated position P22. The hydraulic reservoir 44 can be omitted from the hydraulic device 10 or can be provided at the hydraulic component BC1.

The base member 12 includes a first additional connecting hole 62 extending from the reserve chamber 46 toward the cylinder bore 32. The hydraulic cylinder 31 includes a second additional connecting hole 64 extending from the cylinder bore 32 to the first additional connecting hole 62 to connect the reserve chamber 46 to the cylinder bore 32. The first additional connecting hole 62 and the second additional connecting hole 64 can be omitted from the base member 12 and the hydraulic cylinder 31.

As seen in FIG. 5, the base member 12 includes a bleeding port 65 connected to the reservoir bore 50. In this embodiment, the bleeding port 65 includes a threaded hole 66. The threaded hole 66 connects the reservoir bore 50 to an outside surface of the base member 12. The hydraulic device 10 includes a bleeding plug 68. The bleeding plug 68 is threadedly engaged with the threaded hole 66. The bleeding port 65 can be omitted from the hydraulic device 10.

As seen in FIG. 4, the hydraulic device 10 further comprises a piston biasing member 70 to bias the piston 30 from the actuated position P22 toward the initial position P21. In this embodiment, the piston biasing member 70 is provided outside the cylinder bore 32. However, the piston biasing member 70 can be provided in the cylinder bore 32.

As seen in FIG. 1, the hydraulic device 10 comprises a first electrical switch SW1, a second electrical switch SW2, and a third electrical switch SW3. The first electrical switch SW1 is provided at the pommel portion 21 of the base member 12. The second electrical switch SW2 and the third electrical switch SW3 are provided at the operating member 14. The first electrical switch SW1 is configured to receive a user input to operate the electrical device BC2. The second electrical switch SW2 is configured to receive one of a user upshift input and a user downshift input for the additional device BC3. The third electrical switch SW3 is configured to receive the other of the user upshift input and the user downshift input for the additional device BC3.

As seen in FIG. 3, the hydraulic device 10 comprises an electronic controller 76 (hereinafter referred to as the controller 76) electrically connected to the electrical device BC2 and the additional device BC3 with the electrical control cable 6 using power line communication technology. The controller 76 includes a processor, a memory, and a substrate. Power line communication (PLC) carries data on a conductor that is also used simultaneously for electric power transmission or electric power distribution to the electrical device BC2 and the additional device BC3. The power source voltage is supplies from a battery BT with the electrical control cable 6.

The controller 76 is electrically connected to the first electrical switch SW1, the second electrical switch SW2, and the third electrical switch SW3 to receive the user input, the user upshift input, and the user downshift input from the first electrical switch SW1, the second electrical switch SW2, and the third electrical switch SW3. The first electrical switch SW1, the second electrical switch SW2, and the third electrical switch SW3, and the controller 76 include structures that are known in a vehicle field. Thus, they will not be described in detail here for the sake of brevity.

Modifications

Figure 8:
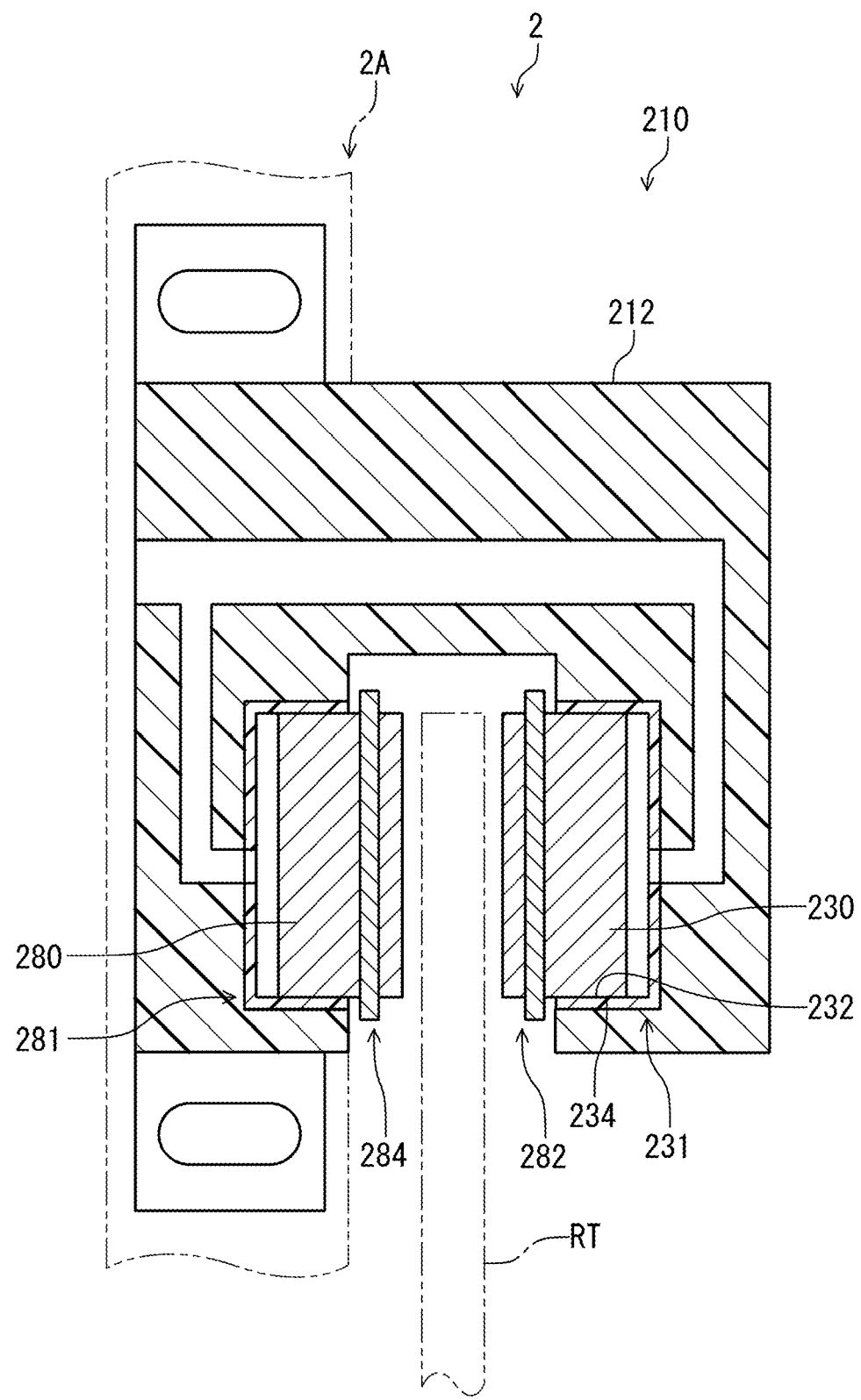
FIG. 8 is a cross-sectional view of a hydraulic device in accordance with another modification.

The structure of the hydraulic device 10 can apply to other devices such as a brake caliper. As seen in FIG. 8, for example, a hydraulic device 210 for the human powered vehicle 2 comprises a base member 212, a piston 230, and a hydraulic cylinder 231. The base member 212 is mounted to the vehicle body 2A. The base member 212 is made of the first non-metallic material. The hydraulic cylinder 231 is provided to the base member 212 and defines a cylinder bore 232. The hydraulic cylinder 231 includes a main portion 234 in which the piston 230 is movably arranged. The main portion 234 is made of the second non-metallic material that is different from the first non-metallic material.

The base member 212 has substantially the same structure as that of the base member 12 of the first embodiment. The piston 230 has substantially the same structure as that of the piston 30 of the first embodiment. The hydraulic cylinder 231 has substantially the same structure as that of the hydraulic cylinder 31 of the first embodiment.

The hydraulic device 210 further comprises an additional piston 280 and an additional hydraulic cylinder 281. The additional piston 280 has substantially the same structure as that of the piston 230. The additional hydraulic cylinder 281 has substantially the same structure as that of the hydraulic cylinder 231.

The hydraulic device 210 further comprises a friction member 282 movably mounted on the base member 212 so as to be moved in response to a movement of the piston 230. The hydraulic device 210 further comprises an additional friction member 284 movably mounted on the base member 212 so as to be moved in response to a movement of the additional piston 280. The friction member 282 and the additional friction member 284 are slidable with a disc brake rotor RT.

In the above embodiment and modification illustrated in FIGS. 1 to 8, the first non-metallic material includes the first resin, and the second non-metallic material includes the second resin. However, the first non-metallic material and the second non-metallic material are not limited to the above embodiment and modification. The second non-metallic material can be different from the first non-metallic material in terms of several factors such as (1) a resin component of the resin, (2) a component of the fiber, (3) a content ratio of the fiber to the resin, (4) a component of an additive, and (5) a content ratio of the additive to the resin. For example, the second non-metallic material can be different from the first non-metallic material when at least one of the factors (1) to (5) of the second non-metallic material is different from corresponding at least one of the factors (1) to (5) of the first non-metallic material.

Figure 9:
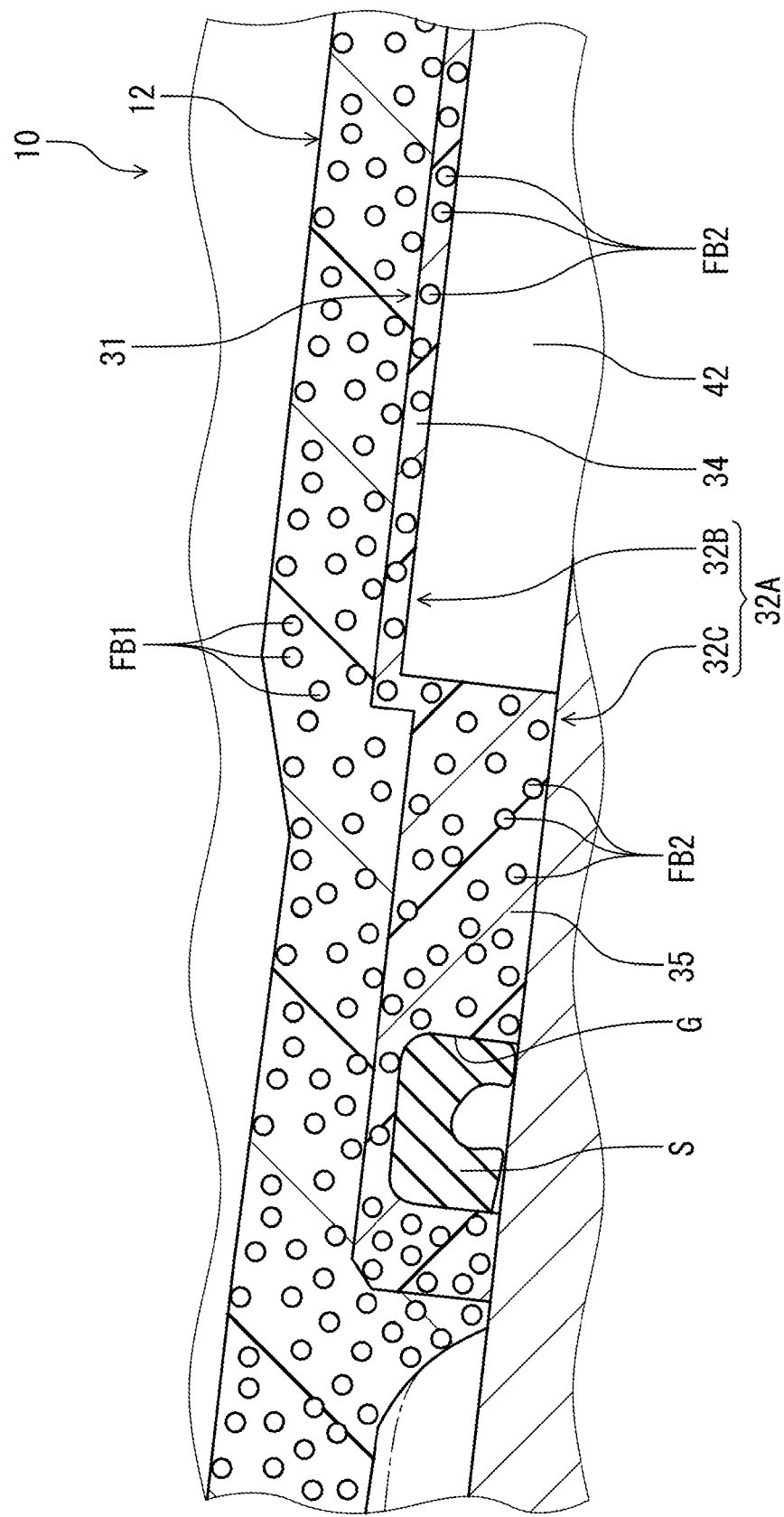
FIG. 9 is an enlarged partial cross-sectional view of a hydraulic device in accordance with another modification.

As seen in FIG. 9, in a first modification, the first non-metallic material includes a first fiber FB1. The second non-metallic material includes a second fiber FB2. The second fiber FB2 is different from the first fiber FB1. Specifically, a fiber component of the second fiber FB2 is different from a fiber component of the first fiber FB1. Examples of the fiber component include a glass fiber, a carbon fiber, an aramid fiber, and a polyethylene fiber. However, the second fiber FB2 can be the same as the first fiber FB1. For example, the second non-metallic material is different from the first non-metallic material when the second resin is different from the first resin even if the second fiber FB2 is the same as the first fiber FB1. Conversely, the second non-metallic material is different from the first non-metallic material when the second fiber FB2 is different from the first fiber FB1 even if the second resin is the same as the first resin.

The first non-metallic material contains the first fiber FB1 with a first content ratio. The second non-metallic material contains the second fiber FB2 with a second content ratio. For example, the first content ratio of the first fiber FB1 is a ratio of a total weight of the first fiber FB1 to a total weight of the base member 12. The second content ratio of the second fiber FB2 is a ratio of a total weight of the second fiber FB2 to a total weight of the hydraulic cylinder 31. In the first modification, the second content ratio of the second fiber FB2 is different from the first content ratio of the first fiber FB1. However, the second content ratio of the second fiber FB2 can be equal to the first content ratio of the first fiber FB1. For example, in a case where the second resin is the same as the first resin, the second non-metallic material is different from the first non-metallic material when the second fiber FB2 is different from the first fiber FB1 even if the second content ratio of the second fiber FB2 is equal to the first content ratio of the first fiber FB1. Conversely, in a case where the second resin is the same as the first resin, the second non-metallic material is different from the first non-metallic material when the second content ratio of the second fiber FB2 is different from the first content ratio of the first fiber FB1 even if the second fiber FB2 is the same as the first fiber FB1. In a case where the second resin is the same as the first resin, the second non-metallic material is different from the first non-metallic material when the second content ratio of the second fiber FB2 is different from the first content ratio of the first fiber FB1 and when the second fiber FB2 is different from the first fiber FB1. In a case where the second resin is the same as the first resin, the second non-metallic material is different from the first non-metallic material when the second content ratio of the second fiber FB2 is equal to the first content ratio of the first fiber FB1 and when the second fiber FB2 is the same as the first fiber FB1.

In a second modification, the first non-metallic material includes a first additive. The second non-metallic material includes a second additive. The first additive is added to the first resin to change characteristics of the first resin. The second additive is added to the second resin to change characteristics of the second resin. In the second modification, the second additive is different from the first additive. However, the second additive can be the same as the first additive. For example, the second non-metallic material is different from the first non-metallic material when the second resin is different from the first resin even if the second additive is the same as the first additive. Conversely, the second non-metallic material is different from the first non-metallic material when the second additive is different from the first additive even if the second resin is the same as the first resin.

The first non-metallic material contains the first additive with a first content ratio. The second non-metallic material contains the second additive with a second content ratio. The first content ratio of the first additive is a ratio of a total weight of the first additive to a total weight of the base member 12. The second content ratio of the second additive is a ratio of a total weight of the second additive to a total weight of the hydraulic cylinder 31. In the second modification, the second content ratio of the second additive is different from the first content ratio of the first additive. However, the second content ratio of the second additive can be equal to the first content ratio of the first additive. For example, in a case where the second resin is the same as the first resin, the second non-metallic material is different from the first non-metallic material when the second additive is different from the first additive even if the second content ratio of the second additive is equal to the first content ratio of the first additive. Conversely, in a case where the second resin is the same as the first resin, the second non-metallic material is different from the first non-metallic material when the second content ratio of the second additive is different from the first content ratio of the first additive even if the second additive is the same as the first additive. In a case where the second resin is the same as the first resin, the second non-metallic material is different from the first non-metallic material when the second content ratio of the second additive is different from the first content ratio of the first additive and when the second additive is different from the first additive. In a case where the second resin is the same as the first resin, the second non-metallic material is different from the first non-metallic material when the second content ratio of the second additive is equal to the first content ratio of the first additive and when the second additive is the same as the first additive.

In a third modification, the first modification is combined with the second modification. For example, the first non-metallic material includes the first resin, the first fiber FB1, and the first additive. The second non-metallic material includes the second resin, the second fiber FB2, and the second additive. The second non-metallic material is different from the first non-metallic material when at least one of the first resin, the first fiber FB1, the first content ratio of the first fiber FB1, the first additive, and the first content ratio of the first additive is different from corresponding at least one of the second resin, the second fiber FB2, the second content ratio of the second fiber FB2, the second additive, and the second content ratio of the second additive.

Figure 10:
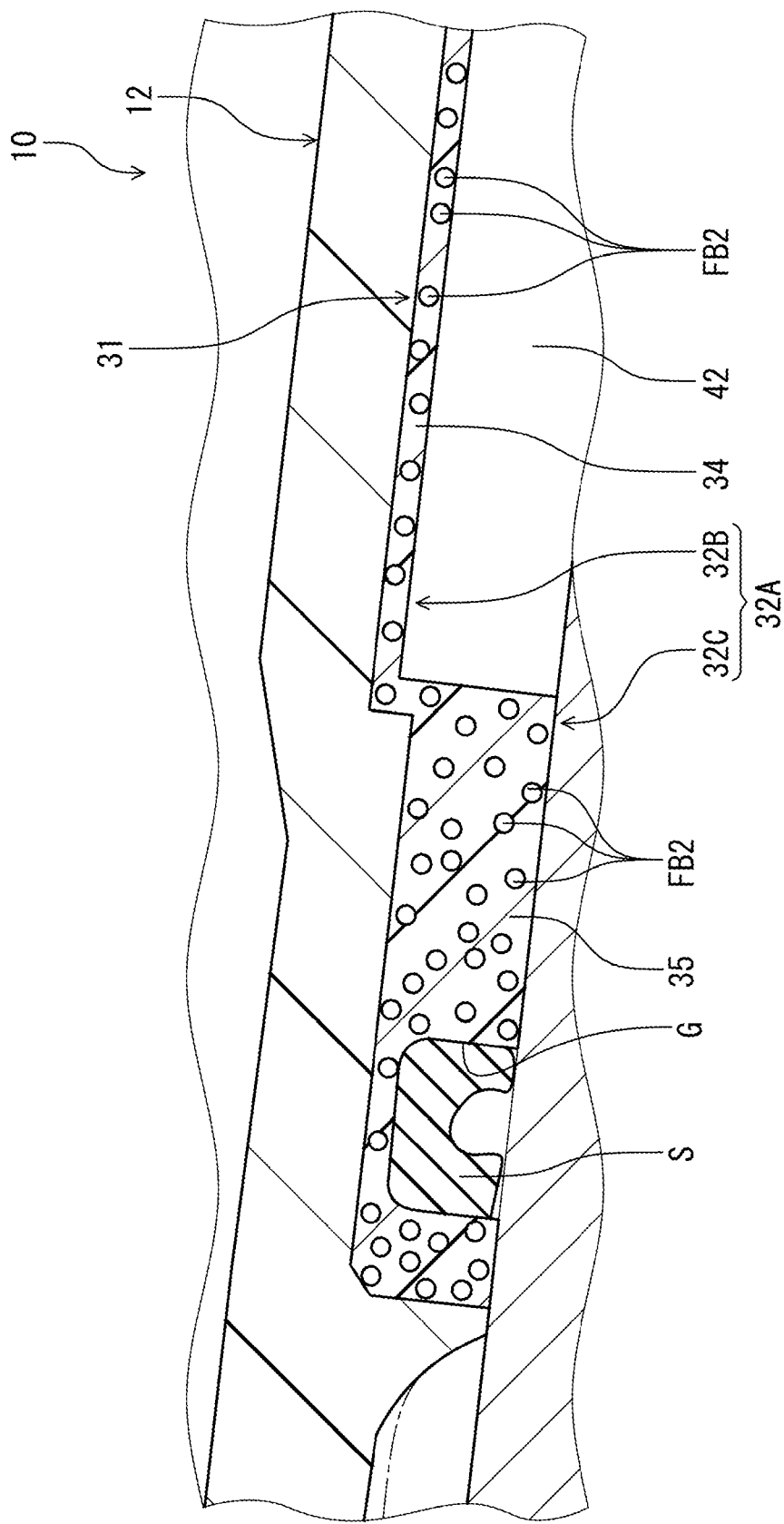
FIG. 10 is an enlarged partial cross-sectional view of a hydraulic device in accordance with another modification.

In a fourth modification, as seen in FIG. 10, the first fiber FB1 can be omitted from the first non-metallic material of the first modification. The second non-metallic material is different from the first non-metallic material even if the second resin is the same as the first resin since the second non-metallic material includes the second fiber FB2. Similarly, the second fiber FB2 can be omitted from the second non-metallic material of the first modification. The second non-metallic material is different from the first non-metallic material even if the second resin is the same as the first resin since the first non-metallic material includes the first fiber FB1.

In a fifth modification, the first additive can be omitted from the first non-metallic material of the second modification. The second non-metallic material is different from the first non-metallic material even if the second resin is the same as the first resin since the second non-metallic material includes the second additive. Similarly, the second additive can be omitted from the second non-metallic material of the second modification. The second non-metallic material is different from the first non-metallic material even if the second resin is the same as the first resin since the first non-metallic material includes the first additive.

For example, the first content ratio ranges from 20% to 50% in a case where the first fiber FB1 includes a carbon fiber. This modification can improve strength of the base member 12 and save a weight of the base member 12. The first content ratio ranges from 40% to 80% in a case where the first fiber FB1 includes a glass fiber. This modification can improve strength of the base member 12. The second content ratio ranges from 30% to 50% in a case where the second fiber FB1 includes a glass fiber. In this modification, the second non-metallic material can include, as the second additive, a sliding facilitation material such as polytetrafluoroethylene (PTFE) or fluorine.

The hydraulic device 10 illustrated in FIGS. 1 to 7 includes a hydraulic operating device for a road bike. However, the above embodiment and modifications can apply to any type of hydraulic operating device. The hydraulic device 210 illustrated in FIG. 8 includes a disc brake caliper (a hydraulic operated device). However, the above embodiment and modifications can apply to a rim brake caliper.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other. The phrase "at least one of" as used in the present application means "one or more" of a desired choice. For one example, the phrase "at least one of" as used in the present application means "only one single choice" or "both of two choices" if the number of its choices is two. For another example, the phrase "at least one of" as used in the present application means "only one single choice" or "any combination of equal to or more than two choices" if the number of its choices is equal to or more than three. The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic device for a human powered vehicle, the hydraulic device comprising:
   a piston;
   a base member made of a first non-metallic material;
   a hydraulic cylinder provided to the base member and defining a cylinder bore, the hydraulic cylinder including a main portion in which the piston is movably arranged, the main portion being made of a second non-metallic material that is different from the first non-metallic material;
   at least one of the base member and the hydraulic cylinder including an annular groove that communicates with the cylinder bore;
   a first seal member provided in the annular groove in slidable contact with the piston;
   a second seal member attached to the piston and in slidable contact with the hydraulic cylinder; and
   an operating member movably coupled to the base member so as to move the piston in response to a movement of the operating member.

2. The hydraulic device according to claim 1, wherein the first non-metallic material includes a first resin, and the second non-metallic material includes a second resin that is different from the first resin.

3. The hydraulic device according to claim 1, wherein the first non-metallic material includes a first fiber, and the second non-metallic material includes a second fiber that is different from the first fiber.

4. The hydraulic device according to claim 3, wherein the first non-metallic material contains the first fiber with a first content ratio, and
the second non-metallic material contains the second fiber with a second content ratio that is different from the first content ratio.

5. The hydraulic device according to claim 1, wherein the first non-metallic material includes a first additive, and the second non-metallic material includes a second additive that is different from the first additive.

6. The hydraulic device according to claim 5, wherein the first non-metallic material contains the first additive with a first content ratio, and
the second non-metallic material contains the second additive with a second content ratio that is different from the first content ratio.

7. The hydraulic device according to claim 1, wherein the hydraulic cylinder is made of the second non-metallic material.

8. The hydraulic device according to claim 1, wherein the hydraulic cylinder is attached directly to the base member without another member between the hydraulic cylinder and the base member,
the hydraulic cylinder is attached directly to the base member without an adhesive between the hydraulic cylinder and the base member.

9. The hydraulic device according to claim 1, wherein the hydraulic cylinder includes an outer peripheral surface, and
the base member at least partly covers the outer peripheral surface of the hydraulic cylinder.

10. The hydraulic device according to claim 1, wherein the main portion has a first inner diameter and a first radial thickness that is smaller than the first inner diameter,
the first radial thickness is
equal to or larger than 0.5 mm and
equal to or smaller than 5 mm.

11. The hydraulic device according to claim 10, wherein the cylinder bore includes an additional portion having a second inner diameter that is smaller than the first inner diameter,
the additional portion has a second radial thickness that is smaller than the second inner diameter.

12. The hydraulic device according to claim 11, wherein the main portion has a first outer diameter, and
the additional portion has a second outer diameter that is smaller than the first outer diameter.

13. The hydraulic device according to claim 11, wherein the additional portion extends from the main portion in an axial direction of the hydraulic cylinder.

14. The hydraulic device according to claim 1, wherein the hydraulic cylinder includes an inner peripheral surface defining the cylinder bore, and
the hydraulic cylinder includes the annular groove that is provided on the inner peripheral surface.

15. The hydraulic device according to claim 14, wherein the base member includes the annular groove that is provided between the base member arid the hydraulic cylinder.

16. A hydraulic device for a human powered vehicle, the hydraulic device comprising:
   a piston;
   a base member made of a first non-metallic material;
   a hydraulic cylinder provided to the base member and defining a cylinder bore, the hydraulic cylinder including a main portion in which the piston is movably arranged, the main portion being made of a second non-metallic material; and a coupling layer coupling the base member and the main portion of the hydraulic cylinder, the coupling layer being coincident with an outer peripheral surface of the hydraulic cylinder, the coupling layer being at least partly provided to the main portion of the hydraulic cylinder;

at least one of the base member and the hydraulic cylinder including an annular groove that communicates with the cylinder bore, and a seal member provided in the annular groove in slidable contact with the piston.

17. The hydraulic device according to claim 16, wherein the hydraulic cylinder is made of the second non-metallic material, and the coupling layer is provided entirely to the main portion of the hydraulic cylinder.

18. A hydraulic device for a human powered vehicle, the hydraulic device comprising:

a piston;

a base member made of a first non-metallic material;

a hydraulic cylinder provided to the base member and definine a cylinder bore, the hydraulic cylinder including a main portion in which the piston is movably arranged, the main portion being made of a second non-metallic material that is different from the first non-metallic material;

at least one of the base member and the hydraulic cylinder including an annular groove that communicates with the cylinder bore;

a first seal member provided in the annular groove in slidable contact with the piston;

a second seal member attached to the piston and in slidable contact with the hydraulic cylinder; and a hydraulic reservoir including a reserve chamber that is in fluid communication with the cylinder bore.

19. The hydraulic device according to claim 18, wherein the base member includes a first connecting hole extending from the reserve chamber toward the cylinder bore, and the hydraulic cylinder includes a second connecting hole extending from the cylinder bore to the first connecting hole to connect the reserve chamber to the cylinder bore.

20. A hydraulic device for a human powered vehicle, further the hydraulic device comprising:

a piston;

a base member made of a first non-metallic material;

a hydraulic cylinder provided to the base member and defining a cylinder bore, the hydraulic cylinder including a main portion in which the piston is movably arranged, the main portion being made of a second non-metallic material that is different from the first non-metallic material;

at least one of the base member arid the hydraulic cylinder including an annular groove that communicates with the cylinder bore:

a first seal member provided in the annular groove in slidable contact with the piston;

a second seal member attached to the piston and in slidable contact with the hydraulic cylinder; and a friction member movably mounted on the base member so as to be moved in response to a movement of the piston.

* * * * *